(12) United States Patent
Grossmann et al.

(10) Patent No.: US 6,332,530 B1
(45) Date of Patent: Dec. 25, 2001

(54) APPARATUS FOR MANIPULATING BLOCK-SHAPED COMMODITIES

(75) Inventors: Jürgen Grossmann, Wentorf; Michael Kleine Wächter, Lankau, both of (DE)

(73) Assignee: Topack Verpackungstechnik GmbH (DE)

( * ) Notice: Subject to any disclaimer, the term of this patent is extended or adjusted under 35 U.S.C. 154(b) by 0 days.

(21) Appl. No.: 09/443,897

(22) Filed: Nov. 19, 1999

(30) Foreign Application Priority Data

Nov. 19, 1998 (DE) .............................................. 198 53 313

(51) Int. Cl.[7] ........................... B65G 29/00; B65G 37/00; B65G 47/04; B65G 47/34; B65G 47/84
(52) U.S. Cl. .................................... 198/468.8; 198/469.1; 198/478.1
(58) Field of Search ............................. 198/468.8, 469.1, 198/478.1, 704

(56) References Cited

U.S. PATENT DOCUMENTS

| | | |
|---|---|---|
| 4,511,027 | 4/1985 | Zamboni . |
| 5,873,453 | 2/1999 | Vetter . |

FOREIGN PATENT DOCUMENTS

| | | |
|---|---|---|
| 197 03 069 | 7/1998 | (DE) . |
| 0 756 995 | 2/1997 | (EP) . |

*Primary Examiner*—Christopher P. Ellis
*Assistant Examiner*—Gene O. Crawford
(74) *Attorney, Agent, or Firm*—Venable; George H. Spencer; Robert Kinberg

(57) ABSTRACT

An apparatus for transporting successive at least partially wrapped blocks of cigarettes or the like, e.g., in a packing machine, employs a mobile block supplying member which advances successive blocks of a series of blocks on top of an opening in a bottom wall at a level below a turntable indexible about a vertical axis and carrying several open-bottom receptacles which are movable radially of the axis. An empty receptacle is located above the opening of the bottom wall in response to completion of each indexing step. At such time, a pusher is moved upwardly through the opening of the bottom wall to raise a block into the registering receptacle. In order to avoid movements of blocks relative to the respective receptacles during indexing of the turntable, the freshly filled receptacles are moved radially of the turntable so that the blocks therein at least partially overlie a blocking or confining platform, which is indexible with the turntable, until the receptacles reach a transfer station where the blocks are accepted by a second turntable.

10 Claims, 4 Drawing Sheets

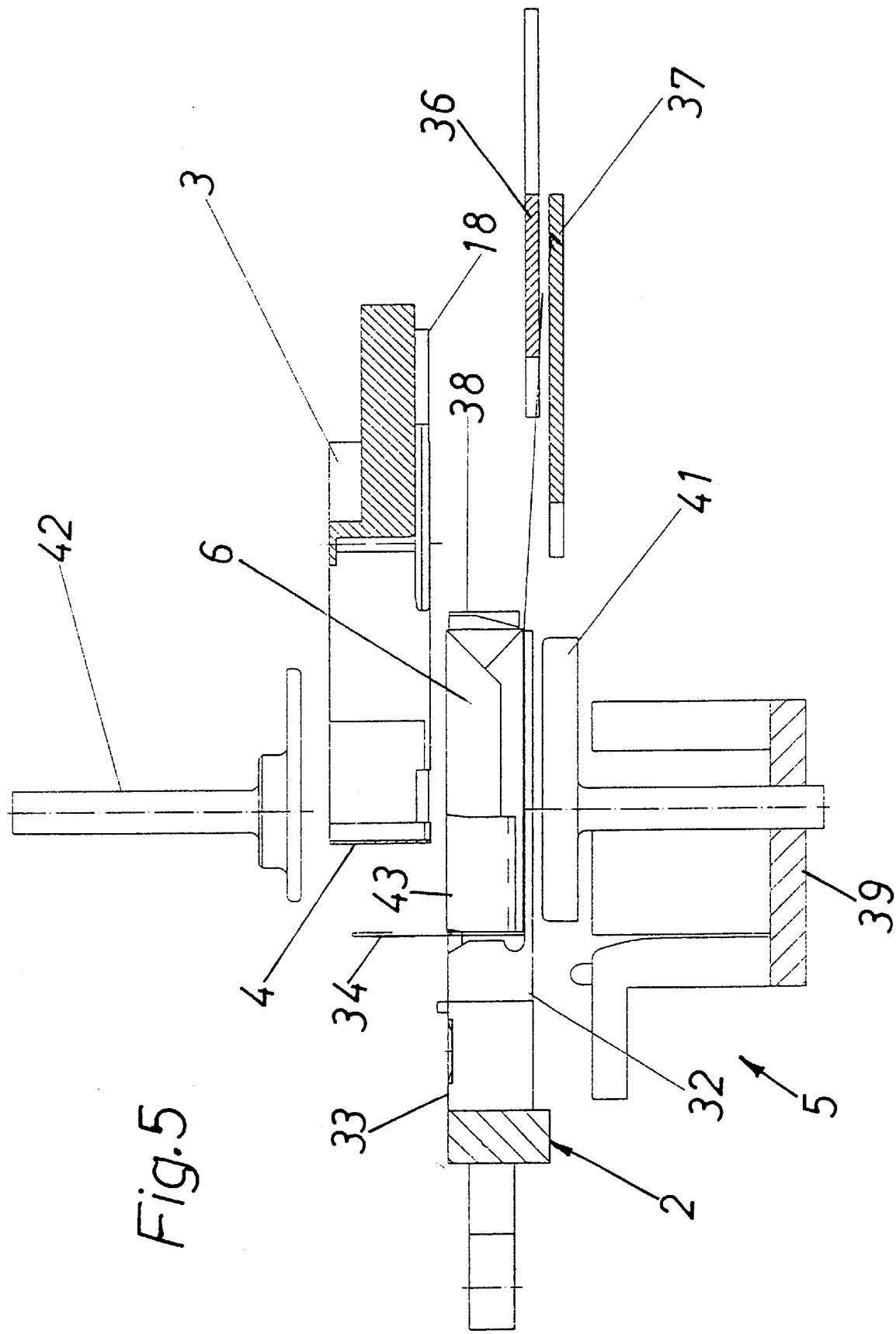

APPARATUS FOR MANIPULATING BLOCK-SHAPED COMMODITIES

CROSS-REFERENCE TO RELATED CASES

This application claims the priority of German patent application Serial No. 198 53 313.6 filed Nov. 19, 1998. The disclosure of the above-identified German patent application, as well as that of each US and foreign patent and patent application mentioned in the specification of the present application, is incorporated herein by reference.

BACKGROUND OF THE INVENTION

The present invention relates to improvements in apparatus for manipulating block-shaped commodities, especially at least partially wrapped block-shaped packets of cigarettes or other rod-shaped articles of the tobacco processing industry. More particularly, the invention relates to improvements in apparatus for subjecting block-shaped commodities (hereinafter called packets for short) to a treatment which includes transferring packets from a first level to a second level, e.g., from a lower level to a higher level. Still more particularly, the invention relates to improvements in apparatus wherein successive packets are brought to a halt in a preselected portion (such as the discharge end) of a path which is disposed or which at least terminates at the first level, and the thus arrested packets are thereupon transferred into successive receptacles of a conveyor which is caused to circulate (such as turn about a vertical axis) at the second level.

Apparatus of the above outlined character are disclosed in commonly owned European patent application Serial No. 0 756 995 A1. The conveyor of the apparatus which is disclosed in the European patent application is a turntable which is indexible about a vertical axis to thus move successive receptacles to a position of vertical alignment with successively supplied packets at the first level. The turntable forms part of a wrapping or packing unit in that it cooperates with suitable wrapping instrumentalities in order to carry out one or more wrapping or packing operations. Furthermore, the apparatus of the European patent application employs a confining device which is operative to hold freshly introduced packets in the respective receptacles of the turntable and, to this end, cooperates with a system of pushers serving to transfer packets from the first level into successive receptacles of the conveyor at the second level. The purpose of the confining device is to permit an increase of the output of the packing or wrapping machine in that it permits an indexing of the turntable at a very high frequency without risking ejection of packets from, or an undesirable shifting of packets in, their respective receptacles.

The turntable of the aforementioned (first) conveyor delivers partially wrapped packets into the range of a second conveyor, e.g., a second turntable, which also forms part of the wrapping means for the packets received from the first conveyor. Reference may be had to the commonly owned published German patent application Serial No. 197 03 069 A1 which discloses means for folding blanks around successive packets during transfer of packets from the receptacles of the first conveyor into the receptacles of the second conveyor. The blanks can constitute outer or outermost envelopes of the finished products (e.g., properly wrapped arrays of 20 plain or filter cigarettes each in a so-called quincunx formation).

OBJECTS OF THE INVENTION

An object of the invention is to provide an apparatus wherein packets of arrayed cigarettes or other block-shaped commodities can be retained in the receptacles of the conveyor at the second level with a degree of reliability higher than that achievable in heretofore known apparatus.

Another object of the invention is to provide the conveyor at the second level with novel and improved receptacles and with novel and improved means for moving such receptacles relative to other parts or constituents of the conveyor.

A further object of the invention is to provide one or more novel and improved conveyors for use in the above outlined apparatus.

An additional object of the invention is to provide a novel and improved method of manipulating cigarette packets or analogous block-shaped commodities in a wrapping machine.

Still another object of the invention is to provide a novel and improved wrapping machine for packets of cigarettes or other rod-shaped articles of the tobacco processing industry.

A further object of the invention is to provide novel and improved blocking means for retaining packets in the respective receptacles without assistance from one or more pushers which serve to move packets between different levels.

Still another object of the invention is to provide an apparatus wherein the aforementioned blocking means does not and cannot interfere with the delivery and folding of blanks around the packets travelling with the conveyor which is provided with mobile receptacles.

SUMMARY OF THE INVENTION

The invention is embodied in an apparatus for manipulating substantially block-shaped commodities, e.g., at least partially wrapped or packed block-shaped arrays of cigarettes or other rod-shaped smokers' products. The improved apparatus comprises means for delivering successive commodities to a preselected position at a first level, and a conveyor which is located at a second level, which is repeatedly indexible about an at least substantially vertical axis and which includes a plurality of receptacles movable relative to the axis. A receptacle is in vertical alignment with a commodity occupying the preselected position upon each indexing of the conveyor, and the improved apparatus further comprises means for transferring successive commodities from the preselected position into the aligned receptacles, and means for blocking movements of commodities relative to the respective receptacles during indexing of the conveyor.

The second level is or can be located above the first level; in such apparatus, the receptacles are bottomless or have at least partially open bottoms to permit entry of commodities in response to lifting of such commodities by the transferring means. The transferring means of such apparatus can comprise a pusher which is movable up and down between a lower position beneath the first level and, with a commodity thereon, a second position beneath the second level. The delivering means of such apparatus can comprise a stationary bottom wall having an opening for the pusher at the preselected position, and a mobile member for supplying commodities to the preselected position while the pusher assumes its first position.

The conveyor can include a turntable which is designed in such a way that its receptacles are movable at least substantially radially of the axis into and from the range of the blocking means. The arrangement can be such that the receptacles are movable at least substantially radially of and toward the axis into the range of the blocking means, and at least substantially radially of and away from the axis in order to move out of the range of the blocking means.

The blocking means can comprise a platform which is indexible with the conveyor and has an upper side disposed immediately beneath the receptacles of the conveyor.

The novel features which are considered as characteristic of the invention are set forth in particular in the appended claims. The improved manipulating apparatus itself, however, both as to its construction and the modes of assembling, installing and operating the same, together with numerous additional important and advantageous features and attributes thereof, will be best understood upon perusal of the following detailed description of certain presently preferred specific embodiments with reference to the accompanying drawings.

BRIEF DESCRIPTION OF THE DRAWINGS

FIG. 5 illustrates the structure of FIG. 4 but with the block-shaped array of FIG. 4 shown in a receptacle of the second conveyor.

DESCRIPTION OF PREFERRED EMBODIMENTS

Figure 1:
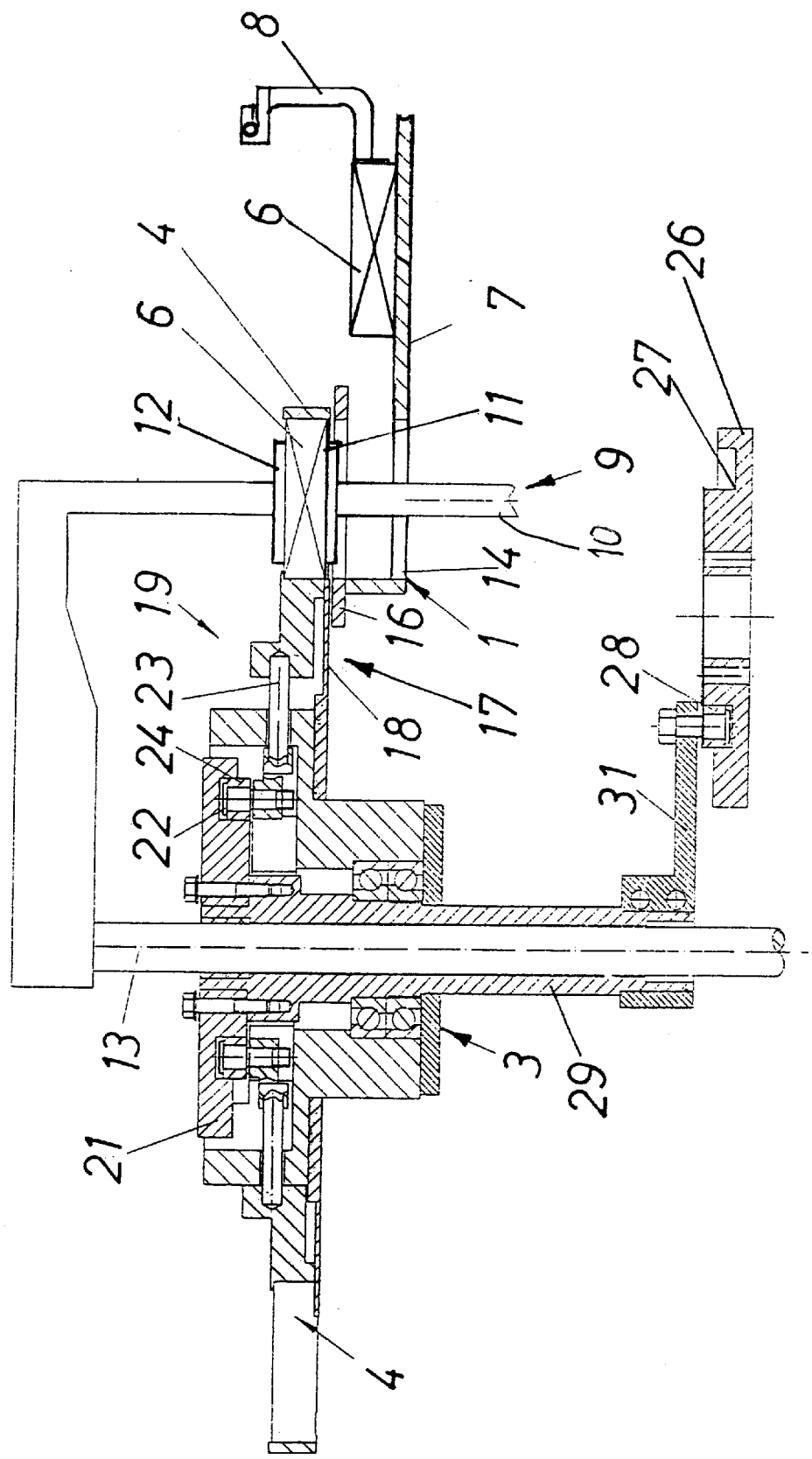
FIG. 1 is a fragmentary longitudinal vertical sectional view of an apparatus which is designed to manipulate block-shaped arrays of cigarettes or the like, a freshly filled receptacle being located at a level above and a fresh block-shaped array being in the process of advancing toward the preselected position.

FIG. 1 shows a portion of an apparatus which can be utilized to manipulate (transport, position and wrap) block-shaped commodities 6 each of which can constitute an at least partially wrapped array of plain or filter cigarettes or other rod-shaped articles of the tobacco processing industry in the customary quincunx formation. If the array comprises twenty rod-shaped articles, the making of a quincunx formation involves confining a median layer of six articles between two layers of seven articles each in such a way that the articles of the median layer are staggered relative to the articles of the outer layers by the radius of an article. For the sake of simplicity, the commodities 6 will be referred to as packets.

The illustrated portion of the apparatus comprises a unit 1 which serves to deliver successive packets of a series of packets 6 to a preselected position above an opening 14 in a horizontal bottom wall 7 of the unit 1. This unit further comprises a suitably shaped pivotable and/or reciprocable mobile member 8 which can push successive packets 6 along the upper side of the bottom wall 7 toward and to the selected position or location above the opening 14.

The delivering unit 1 is installed at a level below that of a conveyor in the form of a turntable 3. This turntable is indexible about the axis of a vertical shaft 13 and includes a set of circumferentially spaced apart open-bottom receptacles 4 which are movable radially of toward and away from the shaft 13 and each of which can receive and temporarily confine and transport a discrete packet 6. For example, and as shown in FIG. 1 of the aforementioned published European patent application No. 0 756 995 A1, the turntable 3 can be provided with four equidistant receptacles 4.

The means for transferring successive packets 6 from the preselected position above the opening 14 of the bottom wall 7 into successive empty receptacles 4 of the turntable 3 is denoted by the character 9 and includes aforementioned shaft 13, a vertically movable plate-like abutment 12 affixed to an L-shaped extension carried by the upper end portion of the shaft 13, and a pusher 11 mounted on a vertically reciprocable supporting shaft 10. The manner in which the shafts 10 and 13 are movable with and relative to each other is known and forms no part of the present invention. Reference may be had again to the aforementioned published European patent application Serial No. 0 756 995 A1. All that counts is that the transferring means can lift successive packets 6 from the preselected position above the opening 14 of the bottom wall 7 into a registering empty receptacle 4 between two succesive indexing movements of the turntable 3 about the vertical axis of the shaft 13.

FIG. 1 shows the pusher 11 in the upper end position in which it supports the underside of a packet 6 in such a way that the packet is confined in the respective receptacle 4. The plate 12 ensures that the packet 6 cannot be propelled above and beyond the position shown in FIG. 1 in response to rapid or abrupt upward movement of the pusher 11. The shaft 10 extends through the opening 14 of the bottom wall 7 and through a registering opening provided in a mouthpiece 16 which is affixed to the bottom wall 7 or to another stationary part and is located directly or closely below the level of the receptacles 4.

Figure 2:
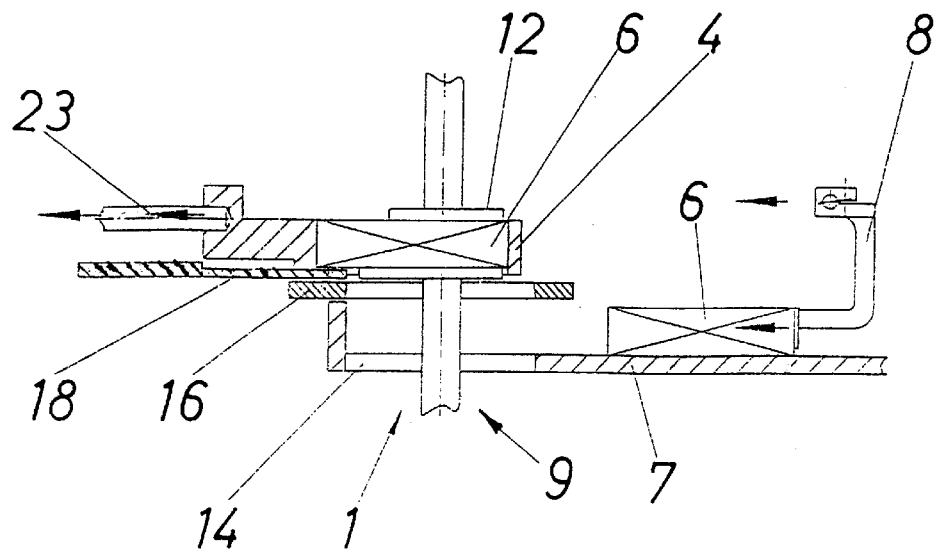
FIG. 2 illustrates a portion of the structure shown in FIG. 1, a freshly filled receptacle being shown within the range of the blocking means.
Figure 3:
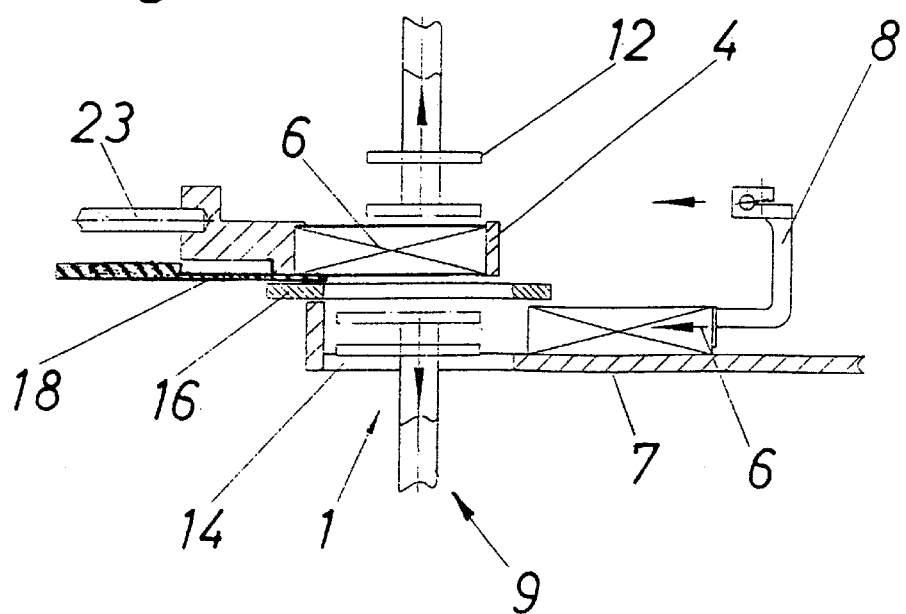
FIG. 3 shows the structure of FIG. 2 but with the transferring means in two positions different from each other and from that shown in FIG. 2.

The means for moving the receptacles 4 of the turntable 3 radially outwardly (see the position of the right-hand receptacle 4 in FIG. 1) and radially inwardly (see the positions of the receptacle 4 which is shown in FIGS. 2 and 3) cooperates with or forms part of a blocking device 17 which serves to confine the packets 6 in the respective receptacles 4 during indexing of the turntable 3. In other words, the packet transferring means 9 is idle when the blocking means 17 is active and vice versa. The blocking means 17 comprises a plate-like horizontal platform 18 which is coaxial and indexible with the turntable 3. The means for moving the receptacles 4 radially of the shaft 13 (inwardly into the range of the blocking means 17 and outwardly out of such range) is shown at 19 and comprises a disc-shaped cam 21 having at its underside an endless cam groove 22 for four roller followers 24 connected to the respective receptacles 4 by rod- or pin-shaped coupling members 23. The cam 21 is or can be movable radially of the shaft 13. The means for moving the cam 21 comprises a driver cam 26 having a cam groove 27 for a roller follower 28 connected to a hollow shaft 29 of the cam 21 by a lever or link 31. The hollow shaft 29 is coaxial with and surrounds the upright shaft 13.

Figure 4:
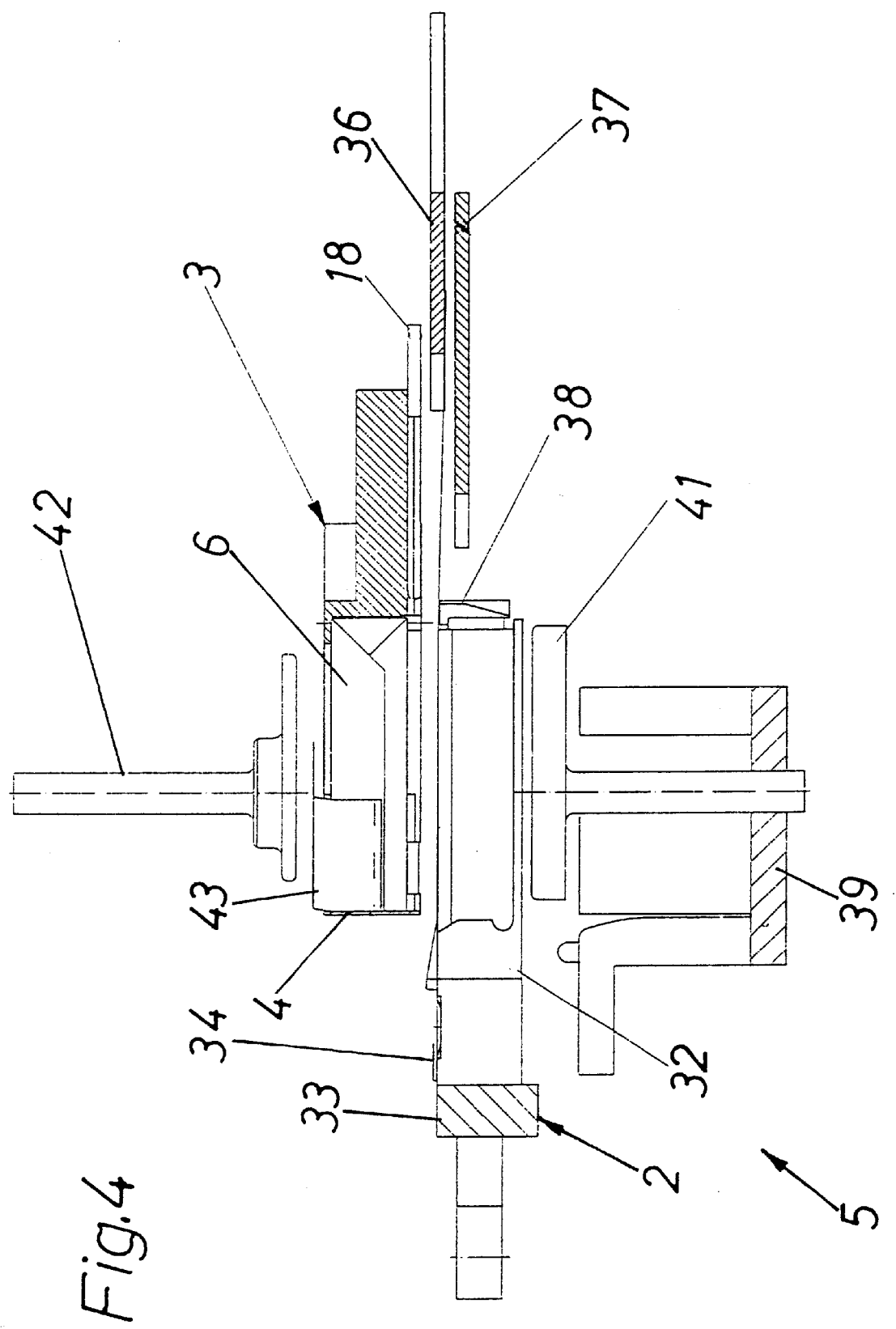
FIG. 4 is an enlarged partly elevational and partly vertical sectional view of the station where the conveyor of FIG. 1 delivers successive block-shaped arrays into the range of a second conveyor.

FIGS. 4 and 5 show a portion of a second conveyor 2 which is a turntable mounted at a level below the level of the turntable 3. Portions of the turntables 2 and 3 overlap each other in the region where successive packets 6 are expelled from the receptacles of the turntable 3 into the then registering empty receptacles or cells 32 of the turntable 2. As can be seen in FIGS. 4 and 5, the level of the turntable 2 is immediately or closely below that of the turntable 3 and the upper side of the turntable 2 carries a support 33 for a blank 34 in such a way that, when supplied between two stationary horizontal guide members 36, 37, the blank 34 overlies a cell 32 of the turntable 2. This blank can be of the type shown in FIGS. 5a to 5i of the published German patent application Serial No. 197 03 069 A1. The length of the blank 34 is such that its front end portion (the left-hand end portion, as viewed in FIG. 4) overlies a cell 32 of the turntable 2 while the trailing portion of the blank is still confined between the guide members 36, 37. The character 38 denotes in FIGS. 4 and 5 a bottom holding member adjacent that cell 32 which registers with a receptacle 42 of the conveyor 3. The bottom holding member 38 is active during the intervals between pairs of successive folding operations.

The transfer station between the turntables 2, 3 further accommodates an outer folding member 39 and a lower folding member 41; these folding members are movable with and relative to each other into and through the cells 32 of the turntable 2. The lower folding member 41 can cooperate with an upper folding member 43 shown in FIGS. 4 and 5 in a position at a level above the turntable 3. The folding members 41, 42 are movable in synchronism with and counter to each other to carry out folding operations of the character described in the aforementioned published German patent application Serial No. 197 03 069 A1.

The mode of operation of the structure shown in FIGS. 1 to 5 is as follows:

FIG. 1 shows the pusher 11 in a position in which the upper side of this pusher supports a packet 6 in the interior of the registering receptacle 4 directly or closely above the plane of the platform 18 of the blocking means 17. The upper side of the packet 6 in the receptacle 4 is engaged by the underside of the plate-like abutment 12. The moving means 19 is thereupon actuated to pull the receptacle 4 (and the packet 6 therein) in a direction to the left into the range of the blocking means 17, namely to a position in which the packet 6 partially overlies the adjacent portion of the platform 18. The extent of overlap is sufficient to ensure that the position of the packet 6 relative to the receptacle 4 remains unchanged or cannot change to any appreciable extent during indexing of the turntable 3, i.e., during rotation of this turntable beyond the pusher 11 and the abutment 12. The pusher can be moved downwardly to a starting position at a level below the opening 14 of the bottom wall 7 as soon as the radially inward movement of the freshly filled receptacle 4 is completed or as soon as the packet 6 in such receptacle is reliably supported by the adjacent marginal portion of the platform 18. The abutment 12 can lifted even before in order to prevent it from interfering with indexing of the turntable 3.

FIG. 2 shows a filled receptacle 4 in the process of moving toward the axis of the shaft 13, and FIG. 3 shows the receptacle in its radially innermost position. FIG. 3 further shows the pusher 11 during downward movement to its lower end position beneath the opening 14 and the abutment 12 during upward movement above and away from the path of receptacles 4. The member 8 is ready to deliver the next packet 6 to the preselected location above the opening 14 as soon as the downward movement of the pusher 11 to a level below the bottom wall 7 is completed.

The first indexing of a freshly filled receptacle 4 from the position shown in FIG. 1 normally includes advancement to a station (not shown) where the packet 6 in such receptacle is provided with a so-called collar 43 (see FIGS. 4, 5 and FIG. 1 of the published European patent application Serial No. 0 756 995 A1). The next indexing involves advancement of the filled receptacle 4 (in the radially retracted position of such receptacle) to the transfer station 5 of FIGS. 4 and 5 where the packets 6 and the collars 43 are transferred from the receptacles 4 into the registering cells 32. The actual transfer is preceded by the radially outward movement of the receptacle 4 at the transfer station 5 so that the platform 18 of the blocking means 17 cannot interfere with the expulsion of the packet 6 and collar 43 from the turntable 3. The actual transfer of a receptacle 6 and collar 43 from their receptacle 4 into the cell 32 then occupying the transfer station 5 is preceded by the advancement of a blank 34 to the position of FIG. 4, i.e., the front portion of such blank 34 then overlies the empty cell of the turntable at the station 5. The transfer involves simultaneous upward movements of the folding members 39, 41 and downward movement of the folding member 42. Such movements of the folding members 39, 41, 42 can take place simultaneously with radially outward movement of the receptacle 4 at the station 5.

The result of the aforedescribed movements of the folding members 39, 41, 42 at the transfer station 5 is that a flap at the left-hand end of the blank 34 is folded upwardly, first against the outer side of the adjacent portion of the receptacle 4 in its radially outer (extended) position. The next stage of transfer and treatment of the packet 6 and blank 34 at the station 5 involves the downward movement of the packet and a portion of the blank 34 including the aforementioned flap into the registering cell 32 (see FIG. 5). The folding members 39, 41 and 42 are thereupon retracted so that the turntables 2 and 3 can be indexed about their respective vertical axes and the receptacle 4 at the station 5 is free to move radially inwardly toward the axis of the shaft 13. This is advisable in order to ensure that the freshly emptied receptacle 4 and the partially deformed blank 34 can bypass each other during the next-following indexing of the turntables 2 and 3.

An important advantage of the improved apparatus is its simplicity. Thus, the blocking means 17 can comprise a single and simple member (platform 18) which can be fixedly secured to and can share the angular movements of the turntable 3. Such simple member 18 can cooperate with the radially movable receptacles 4 to ensure that the packets 6 are reliably held during indexing from the station shown in the right-hand portion of FIG. 1 to the transfer station 5 of FIGS. 4 and 5.

It is equally possible to employ blocking means 17 with a platform (corresponding to the platform 18) which is held against rotation with the turntable 3. The embodiment which is shown in the drawings and employs a platform 18 which is indexible with the turntable 3 is preferred at this time because the undersides of the packets 6 in their receptacles 4 need not slide relative to the platform 18 during indexing toward the transfer station 5.

Another important advantage of the improved apparatus is that the receptacles 4 which are retracted toward the axis of the shaft 13 and the partially deformed blanks 34 can readily bypass each other during indexing of the conveyors 2, 3 to move the freshly filled cells 32 and the freshly emptied receptacles 4 away from the transfer station 5. Such movements of the receptacles 4 and blanks 34 are possible even though the foremost flap of the blank 34 is already folded before the respective cell 32 leaves the station 5. Consequently, the planes of the turntables 2, 3 can be moved very close to each other which renders it possible to reduce the length of the upward strokes of the pusher 11, i.e., to shorten the intervals which are required to transfer a packet 6 from the bottom wall 7 into the receptacle 4 then located above the opening 14 in the bottom wall. This contributes to the output of the improved apparatus.

An additional advantage of the improved apparatus is that it provides ample room for introduction of successive flat blanks 34 between the turntables 2, 3 and for attraction of a thus introduced blank to the upper side of the turntable 2, at least at the transfer station 5. This contributes to more accurate confinement of packets 6 in the envelopes or boxes obtained from the fully deformed or converted blanks 34.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of manipulating block-shaped arrays of rod-shaped smokers' products and analogous commodities and, therefore, such adaptations should and are intended to be comprehended within the meaning and range of equivalence of the appended claims.

What is claimed is:

1. Apparatus for manipulating substantially block shaped commodities, comprising:

means for delivering successive commodities to a preselected position at a first level;

a conveyor located at a second level, repeatedly indexible about an at least substantially vertical axis and including a plurality of receptacles movable relative to said axis, a receptacle being in vertical alignment with a commodity at said preselected position upon each indexing of said conveyor;

means for transferring successive commodities from said preselected position into the aligned receptacles; and means for blocking movements of commodities relative to the respective receptacles during indexing of said conveyor, wherein said receptacles are movable at least substantially radially of said axis into and from the range of said blocking means.

2. The apparatus of claim 1, wherein the commodities are at least partially wrapped block-shaped arrays of rod-shaped smokers' products.

3. The apparatus of claim 1, wherein said second level is located above said first level.

4. The apparatus of claim 1, wherein said conveyor includes a turntable.

5. The apparatus of claim 1, wherein said second level is located above said first level and said transferring means comprises a pusher movable up and down between a lower position beneath said first level and, with a commodity thereon, a second position beneath said second level.

6. The apparatus of claim 5, wherein said delivering means comprises a stationary bottom wall having an opening for said pusher at said preselected position, and a mobile member for supplying commodities to said preselected position while said pusher assumes said first position.

7. The apparatus of claim 1, wherein said blocking means comprises a platform.

8. The apparatus of claim 7, wherein said platform is indexible with said conveyor.

9. The apparatus of claim 8, wherein said platform has an upper side disposed immediately beneath said receptacles.

10. Apparatus for manipulating substantially block shaped commodities, comprising:

means for delivering successive commodities to a preselected position at a first level;

a conveyor located at a second level, repeatedly indexible about an at least substantially vertical axis and including a plurality of receptacles movable relative to said axis, a receptacle being in vertical alignment with a commodity at said preselected position upon each indexing of said conveyor;

means for transferring successive commodities from said preselected position into the aligned receptacles; and means for blocking movements of commodities relative to the respective receptacles during indexing of said conveyor, wherein said receptacles are movable at least substantially radially of and toward said axis into the range of said blocking means and at least substantially radially of and away from said axis out of the range of said blocking means.

* * * * *